(12) United States Patent
Mankame et al.

(10) Patent No.: US 11,400,885 B2
(45) Date of Patent: Aug. 2, 2022

(54) COMPACT, LIGHTWEIGHT AND REUSABLE LOCAL ENERGY ABSORBERS

(71) Applicants: GM GLOBAL TECHNOLOGY OPERATIONS LLC, Detroit, MI (US); Purdue Research Foundation, West Lafayette, IN (US)

(72) Inventors: Nilesh D. Mankame, Ann Arbor, MI (US); Pablo D. Zavattieri, West Lafayette, IN (US); David Restrepo, San Antonio, TX (US); Gordon Jarrold, Chicago, IL (US); Kristiaan Hector, Lafayette, IN (US)

(73) Assignees: GM GLOBAL TECHNOLOGY OPERATIONS LLC, Detroit, MI (US); PURDUE RESEARCH FOUNDATION, West Lafayette, IN (US)

(*) Notice: Subject to any disclaimer, the term of this patent is extended or adjusted under 35 U.S.C. 154(b) by 98 days.

(21) Appl. No.: 16/829,276

(22) Filed: Mar. 25, 2020

(65) Prior Publication Data

US 2020/0307502 A1 Oct. 1, 2020

Related U.S. Application Data

(60) Provisional application No. 62/826,376, filed on Mar. 29, 2019.

(51) Int. Cl.
*B60R 21/34* (2011.01)
*F16F 3/02* (2006.01)
(Continued)

(52) U.S. Cl.
CPC ............ *B60R 21/34* (2013.01); *B62D 25/105* (2013.01); *B62D 25/12* (2013.01); *F16F 3/023* (2013.01);
(Continued)

(58) Field of Classification Search
CPC . B60R 21/34; B60R 2021/343; B62D 25/105; B62D 25/12; F16F 3/023
See application file for complete search history.

(56) References Cited

U.S. PATENT DOCUMENTS

| | | | | |
|---|---|---|---|---|
| 1,344,095 A | * | 6/1920 | Skala | B02D 25/105 180/69.2 |
| 2,572,919 A | * | 10/1951 | French | F16F 13/00 248/562 |

(Continued)

OTHER PUBLICATIONS

Jarrold, Gordon et al. "Cylindrical Shells Based Phase Transforming Cellular Material". The Summer Undergraduate Research Fellowship (SURF) Symposium. Purdue University, West Lafayette, Indiana, USA. Aug. 3, 2017; 5 Pages.

*Primary Examiner* — Paul N Dickson
*Assistant Examiner* — Timothy Wilhelm

(57) ABSTRACT

An energy absorbing structure includes a base, a loading platform, a pair of side supports, a center support, and a pair of flexible segments. The loading platform is spaced apart from the base. The side supports project from the base toward the loading platform. The center support projects from the loading platform toward the base. The flexible segments extend from the side supports to the center support and connect the side supports to the center support. The flexible segments have straight edges and curved surfaces disposed between the straight edges. The straight edges extend from the side supports to the center support and are oriented at an oblique angle relative to the base. Each of the curved surfaces faces one of the base and the loading platform.

20 Claims, 6 Drawing Sheets

(51) Int. Cl.
*B62D 25/10* (2006.01)
*B62D 25/12* (2006.01)

(52) U.S. Cl.
CPC ... *F16F 2224/02* (2013.01); *F16F 2224/0208* (2013.01)

(56) References Cited

U.S. PATENT DOCUMENTS

| | | | | |
|---|---|---|---|---|
| 2,580,815 A * | 1/1952 | Mooney | ............... | F10F 15/073 |
| | | | | 248/583 |
| 3,727,865 A * | 4/1973 | Melrose | ................. | B64G 1/66 |
| | | | | 248/632 |
| 4,269,400 A * | 5/1981 | Jensen | ................... | F16F 1/025 |
| | | | | 188/268 |
| 4,373,665 A * | 2/1983 | Dietzsch | ................ | B29C 45/00 |
| | | | | 180/90 |
| 4,800,815 A * | 2/1989 | Honma | ................... | F03G 7/005 |
| | | | | 310/307 |
| 5,053,708 A * | 10/1991 | Aspect | ..................... | A01F 2/80 |
| | | | | 23/55 |
| 5,310,157 A * | 5/1994 | Platus | .................... | F16F 3/026 |
| | | | | 248/619 |
| 5,370,352 A * | 12/1994 | Platus | .................... | F16F 3/026 |
| | | | | 248/619 |
| 5,529,277 A * | 6/1996 | Ostaszewski | ........... | F16C 11/12 |
| | | | | 248/398 |
| 5,570,286 A * | 10/1996 | Margolis | ................ | B60N 2/501 |
| | | | | 701/36 |
| 5,713,819 A * | 2/1998 | Hsieh | ..................... | A03B 25/08 |
| | | | | 482/127 |
| 5,739,475 A * | 4/1998 | Fujisawa | ............ | B60R 16/0222 |
| | | | | 174/153 G |
| 6,554,341 B2 * | 4/2003 | Lee | ..................... | B62D 25/163 |
| | | | | 296/29 |
| 6,676,101 B2 * | 1/2004 | Platus | .................... | F16F 15/02 |
| | | | | 248/566 |
| 6,983,924 B2 * | 1/2006 | Howell | ................... | F16F 1/027 |
| | | | | 251/118 |
| 7,150,496 B2 * | 12/2006 | Fujimoto | ................ | B60R 21/34 |
| | | | | 296/187.04 |
| 7,204,545 B2 * | 4/2007 | Roux | ..................... | B60R 21/34 |
| | | | | 296/187.04 |
| 7,377,580 B1 * | 5/2008 | Ekladyous | .......... | B62D 25/105 |
| | | | | 180/69.21 |
| 7,411,331 B2 * | 8/2008 | Dubowsky | ............. | G01R 33/28 |
| | | | | 310/309 |
| 7,578,548 B2 * | 8/2009 | Behr | ....................... | B60R 21/34 |
| | | | | 180/69.2 |
| 7,651,156 B2 * | 1/2010 | Park | ....................... | B60R 21/34 |
| | | | | 296/187.04 |
| 7,690,720 B2 * | 4/2010 | Wang | .................... | B62D 25/12 |
| | | | | 296/193.11 |
| 7,735,908 B2 * | 6/2010 | Wang | ................... | B62D 25/105 |
| | | | | 296/193.11 |
| 7,823,959 B2 * | 11/2010 | Wallman | ................ | B60R 21/34 |
| | | | | 290/187.04 |
| 7,828,374 B2 * | 11/2010 | Rinderlin | ............ | B62D 25/163 |
| | | | | 296/198 |
| 7,849,559 B2 * | 12/2010 | Lindmark | ................ | B60R 21/34 |
| | | | | 10/80 A |
| 8,182,027 B2 * | 5/2012 | Steinhilb | ............... | B62D 25/163 |
| | | | | 296/198 |
| 8,246,023 B2 * | 8/2012 | Cappeller | .............. | F16F 1/025 |
| | | | | 267/161 |
| 8,287,011 B2 * | 10/2012 | Cormier | .................. | B60R 21/34 |
| | | | | 293/102 |
| 8,356,857 B2 * | 1/2013 | Ralston | .................... | B60R 21/34 |
| | | | | 296/187.04 |
| 8,485,588 B1 * | 7/2013 | Voss | ........................ | F16F 7/121 |
| | | | | 296/187.04 |
| 8,584,456 B1 * | 11/2013 | McKnight | .............. | H02N 10/00 |
| | | | | 60/527 |
| 8,585,340 B2 * | 11/2013 | Schmitz | .................. | F16B 5/065 |
| | | | | 411/512 |
| 8,807,634 B2 * | 8/2014 | Horimizu | ................ | B60R 21/34 |
| | | | | 296/192 |
| 8,944,495 B2 * | 2/2015 | Tsuneyama | ............. | B60R 21/34 |
| | | | | 296/193.09 |
| 8,973,937 B2 * | 3/2015 | Williams | ............... | B62K 25/04 |
| | | | | 280/276 |
| 8,991,908 B2 * | 3/2015 | Ikeda | ..................... | B60R 21/34 |
| | | | | 296/193.11 |
| 9,027,683 B2 * | 5/2015 | Barnes | .................. | B60K 13/02 |
| | | | | 180/68.3 |
| 9,150,179 B2 * | 10/2015 | Schmitt | .................... | B60R 21/04 |
| 9,234,561 B2 * | 1/2016 | Laurens | ................ | B64G 1/641 |
| 9,381,879 B2 * | 7/2016 | Mankame | ............... | B62D 25/12 |
| 9,387,887 B2 * | 7/2016 | Ishitobi | ................ | B62D 25/105 |
| 9,415,734 B2 * | 8/2016 | Steinhilb | ................. | B60R 19/18 |
| 9,447,839 B2 * | 9/2016 | Dunning | ................. | F16F 3/023 |
| 9,574,527 B2 * | 2/2017 | Fischer | ............... | F02M 35/0201 |
| 9,630,581 B2 * | 4/2017 | Hammer | ................. | G01B 21/02 |
| 9,656,627 B2 * | 5/2017 | Gardynik | ................ | E05F 5/022 |
| 9,718,434 B2 * | 8/2017 | Hector, Jr. | .............. | B60R 21/34 |
| 9,738,148 B1 * | 8/2017 | Waskie | .................... | B60R 21/34 |
| 9,791,014 B1 * | 10/2017 | McKnight | ............... | F16F 3/026 |
| 9,855,914 B1 * | 1/2018 | Hammer | ................ | B60R 19/023 |
| 9,874,200 B2 * | 1/2018 | Blochlinger | ............. | F10F 1/027 |
| 9,901,185 B2 * | 2/2018 | DeFranks | ............ | A47C 23/002 |
| 9,950,744 B2 * | 4/2018 | Hammer | ................ | B60R 21/34 |
| 10,023,239 B2 * | 7/2018 | Mankame | ............... | B60R 21/34 |
| 10,092,055 B2 * | 10/2018 | Hector, Jr. | ................. | B32B 3/08 |
| 10,323,713 B2 * | 6/2019 | Chaen | ................... | F16F 15/08 |
| 10,377,226 B1 * | 8/2019 | Ross | ..................... | B60R 19/52 |
| 10,422,397 B1 * | 9/2019 | McKnight | ............... | F10F 15/00 |
| 10,821,933 B2 * | 11/2020 | Hammer | ................ | B60R 13/0838 |
| 2001/0037538 A1 * | 11/2001 | Duperray | .................. | E05D 1/02 |
| | | | | 16/225 |
| 2008/0111334 A1 * | 5/2008 | Inoue | .................... | B60G 17/021 |
| | | | | 280/124.1 |
| 2009/0096224 A1 * | 4/2009 | Matsubara | ............. | F16F 7/126 |
| | | | | 293/117 |
| 2010/0345095 * | 12/2010 | Stagge | ....................... | A45F 5/00 |
| 2011/0169516 A1 * | 7/2011 | McFarland | ......... | G01R 1/06722 |
| | | | | 324/755.05 |
| 2012/0211297 A1 * | 8/2012 | Ralston | ..................... | F16F 7/12 |
| | | | | 180/274 |
| 2012/0298436 A1 * | 11/2012 | Ho | ........................ | B62D 25/105 |
| | | | | 180/69.2 |
| 2018/0327033 A1 | 11/2018 | Mankame et al. | | |
| 2018/0352890 A1 | 12/2018 | Hector, Jr. et al. | | |

\* cited by examiner

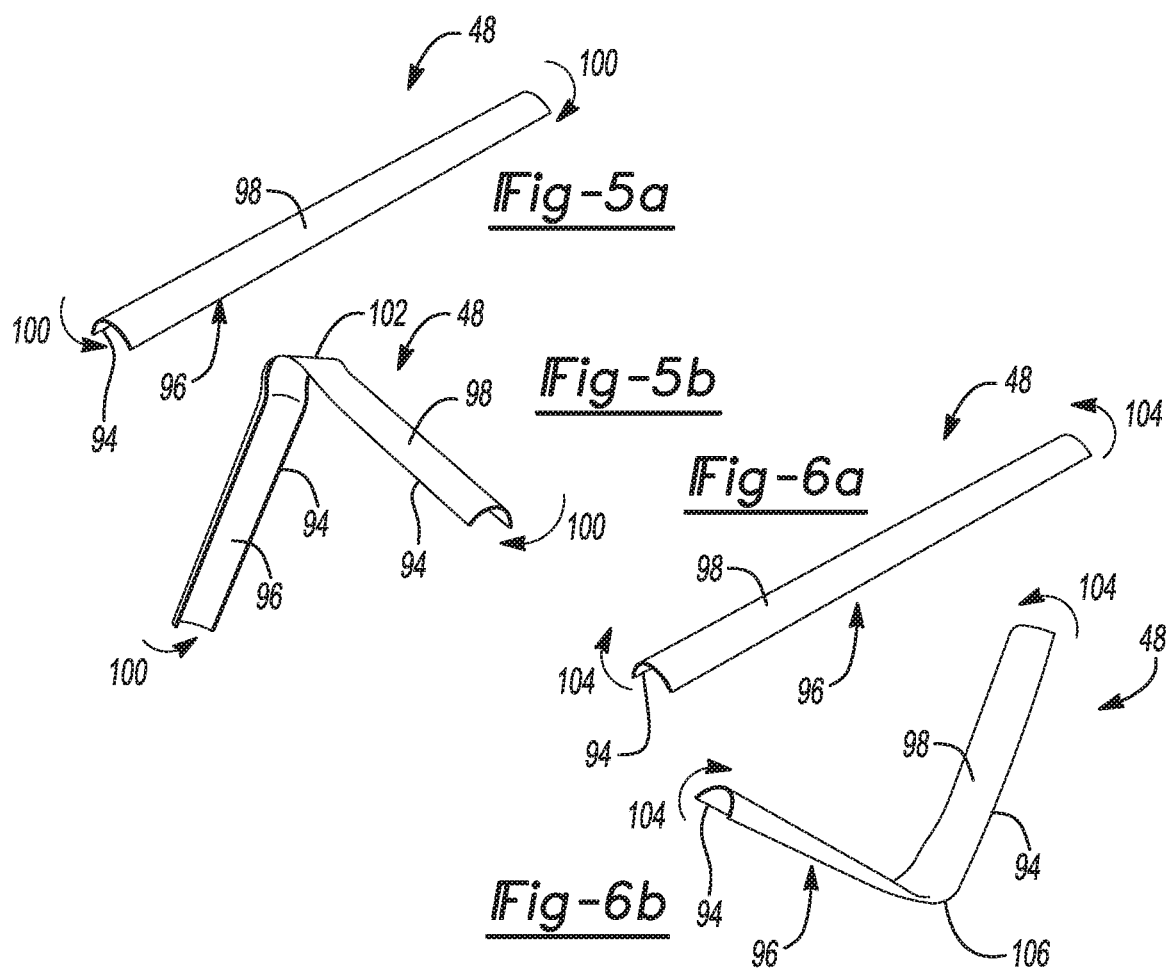
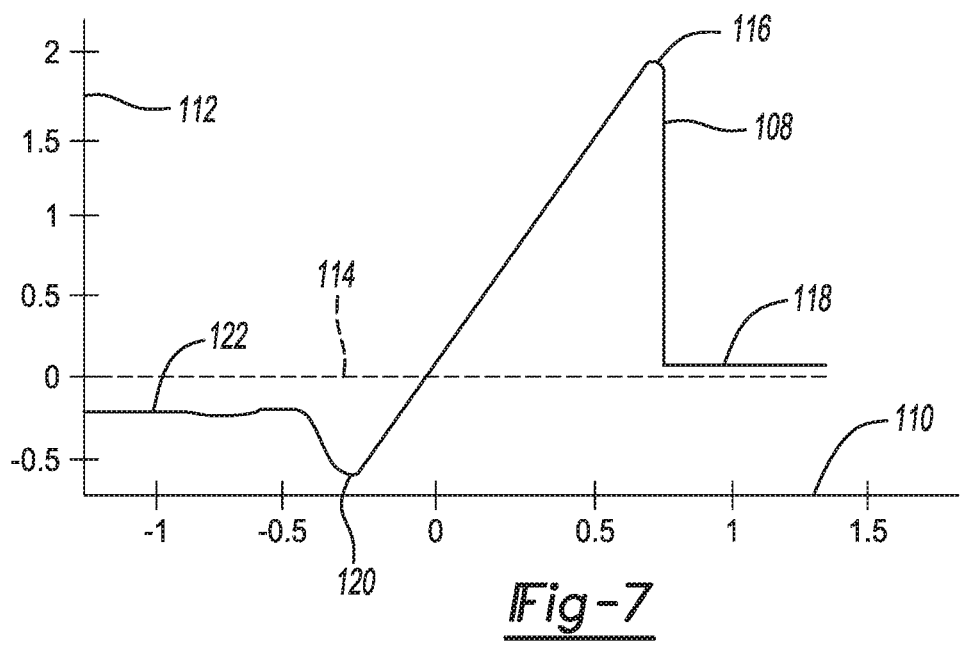

COMPACT, LIGHTWEIGHT AND REUSABLE LOCAL ENERGY ABSORBERS

CROSS-REFERENCE TO RELATED APPLICATIONS

This application claims the benefit of U.S. Provisional Application No. 62/826,376, filed on Mar. 29, 2019. The entire disclosure of the application referenced above is incorporated herein by reference.

GOVERNMENT SUPPORT

This invention was made with government support under CMMI 1538898 awarded by the National Science Foundation. The Government has certain rights in the invention.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to compact, lightweight and reusable local energy absorbers.

Energy absorbing structures are located between a hood of a vehicle and components of the vehicle disposed under the hood to mitigate the effects of or reduce the amount of reaction load applied to an object when the object impacts a hood of the vehicle. Some of under-hood component are disposed relatively close to the hood, and therefore the energy absorbing structures have a small distance to soften the reaction load applied to the object. Thus, ideally, these energy absorbing structures are capable of dissipating a large amount of energy over a small distance.

SUMMARY

An example of an energy absorbing structure according to the present disclosure includes a base, a loading platform, a pair of side supports, a center support, and a pair of flexible segments. The loading platform is spaced apart from the base. The side supports project from the base toward the loading platform. The center support projects from the loading platform toward the base. The flexible segments extend from the side supports to the center support and connect the side supports to the center support. The flexible segments have straight edges and curved surfaces disposed between the straight edges. The straight edges extend from the side supports to the center support and are oriented at an oblique angle relative to the base. Each of the curved surfaces faces one of the base and the loading platform.

In one example, the base and the side supports are integrally formed as a single piece, the loading platform and the center support are integrally formed as a single piece, and the flexible segments are formed separate from the base, the side supports, the loading platform, and the center support.

In one example, the base, the side supports, the loading platform, and the center support are formed from a first material, and the flexible segments are formed from a second material that is different than the first material.

In one example, the second material is has a greater elastic limit than the first material.

In one example, the first material is a polymer material and the second material is a metal.

In one example, the oblique angle at which the flexible segments are oriented relative to the base is an angle between 5 degrees and 95 degrees.

In one example, each of the flexible segments has a length that extends from one of the side supports to the center support, and the length is a multiple of a product of a radius of curvature of the curved surfaces and an angle by which the curved surfaces extend around their respective loci.

In one example, when a load is applied to the loading platform in a direction that urges the loading platform toward the base, the flexible segments are configured to elastically deform while absorbing energy.

In one example, when the loading platform moves closer to the base as the flexible segments elastically deform in response to the load, the flexible segments counteract the load with a biasing force that urges the loading platform to return to its original position.

In one example, each of the side supports includes a vertical wall and an angled wall. The vertical wall is oriented at a right angle relative to the base. The angled wall is oriented at the same oblique angle relative to the base at which the flexible segments are oriented relative to the base.

In one example, the center support includes a vertical wall and a pair of angled walls. The vertical wall of the center support is oriented at a right angle relative to the loading platform. Each of the angled walls of the center support is oriented at the same oblique angle relative to the loading platform at which the flexible segments are oriented relative to the base.

In one example, each of the angled walls of the side supports define curved slots that receive first ends of the flexible segments, and each of the angled walls of the center support define curved slots that receive second ends of the flexible segments opposite of the first ends.

In one example, the curved surfaces of each of the flexible segments include a convex surface that faces the base and a concave surface that faces the loading platform.

An example of an energy absorbing system according to the present disclosure includes multiple ones of the energy absorbing structure arranged adjacent to one another in a side-by-side manner such that an outside surface of at least one of the side supports of one of the energy absorbing structures faces an outside surface of one of the side supports of another one of the energy absorbing structures.

An example of a hood impact mitigation assembly according to the present disclosure includes a vehicle hood, a vehicle component disposed underneath the vehicle hood, and an energy absorbing structure disposed between the vehicle hood and the vehicle component. The vehicle hood has a top surface and an underside surface. The vehicle component has a top surface facing the underside surface of the vehicle hood. The energy absorbing structure is attached to one of the underside surface of the vehicle hood and the top surface of the vehicle component. The energy absorbing structure includes a base, a loading platform spaced apart from the base, a pair of side supports projecting from the base toward the loading platform, a center support projecting from the loading platform toward the base, and a pair of flexible segments. The flexible segments extend from the side supports to the center support and connect the side supports to the center support. The flexible segments have straight edges and curved surfaces disposed between the straight edges. The straight edges extend from the side supports to the center support and are oriented at an oblique angle relative to the base. Each of the curved surfaces face one of the base and the loading platform.

In one example, the energy absorbing structure is attached to the underside surface of the vehicle hood.

In one example, the base and the side supports are integrally formed from a polymer material as a single piece, the loading platform and the center support are integrally formed from the polymer material as a single piece, and the flexible segments are formed from a metal and are formed separate from the base, the side supports, the loading platform, and the center support.

In one example, when a load is applied to the loading platform in a direction that urges the loading platform toward the base, the flexible segments are configured to elastically deform while absorbing energy.

In one example, when the loading platform moves closer to the base as the flexible segments elastically deform in response to the load, the flexible segments counteract the load with a biasing force that urges the loading platform to return to its original position.

In one example, the curved surfaces of each of the flexible segments include a convex surface that faces the base and a concave surface that faces the loading platform.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 5a and 5b are perspective views of a flexible segment of the energy absorbing structure of FIG. 2, where the flexible segment is subjected to same sense bending;

FIGS. 6a and 6b are perspective views of a flexible segment of the energy absorbing structure of FIG. 2, where the flexible segment is subjected to opposite sense bending;

FIG. 7 is a graph of a relationship between a moment applied to an edge of a flexible segment of the energy absorbing structure of FIG. 2 and an angle of that edge relative to a base of the energy absorbing structure of FIG. 2;

In the drawings, reference numbers may be reused to identify similar and/or identical elements.

DETAILED DESCRIPTION

As discussed above, energy absorbing structures are located between a hood of a vehicle and components located under the hood to soften the reaction load applied to an object when the object impacts the hood. Ideally, the energy absorbing structures provide a sharp increase in the reaction load followed by a gradual decrease in the reaction load, all while limiting the magnitude of the reaction load. While some energy absorbing structures are able to achieve this goal, traditional energy absorbing structures are not compact and/or are single-use items that need to be replaced after each use. Energy absorbing structures that fall into this latter category typically experience plastic deformation during a hood impact event.

In contrast, an energy absorbing structure according to the present disclosure is compact and can be reused multiple times to soften the reaction load applied to an object when the object impacts a vehicle hood. The energy absorbing structure includes a base, a loading platform, side supports, the center support, and flexible segments. The loading platform is spaced apart from and parallel to the base. The side supports project from the base toward the loading platform, and the center support projects from the loading platform toward the base. The flexible segments extend from the side supports to the center support and connect the side supports to the center support.

In one example, the loading platform is attached to an underside surface of the hood, and therefore an object impacting the hood applies a load to the loading platform that urges the loading platform toward the base. The flexible segments elastically deform when a sufficient load is applied to the loading platform. In addition, the flexible segments act as a spring by providing a reaction load that urges the loading platform to return its original position. The length of the flexible segments and the angle of the flexible segments relative to the loading platform may be selected to achieve a desired peak reaction load while maximizing the amount of energy dissipated by the energy absorbing structure or minimizing the effect of the impact event on the impacting object.

Although the present disclosure describes energy absorbing structures in a vehicle application, an energy absorbing structure according to the present disclosure may be used in applications other than vehicle applications. For example, an energy absorbing structure according to the present disclosure may be used in helmets, retractable structures in buildings to protect against wind damage, a floor designed to absorb energy from a person falling, or a box-spring (i.e., a bed base) designed to prevent bed sores.

Figure 1:
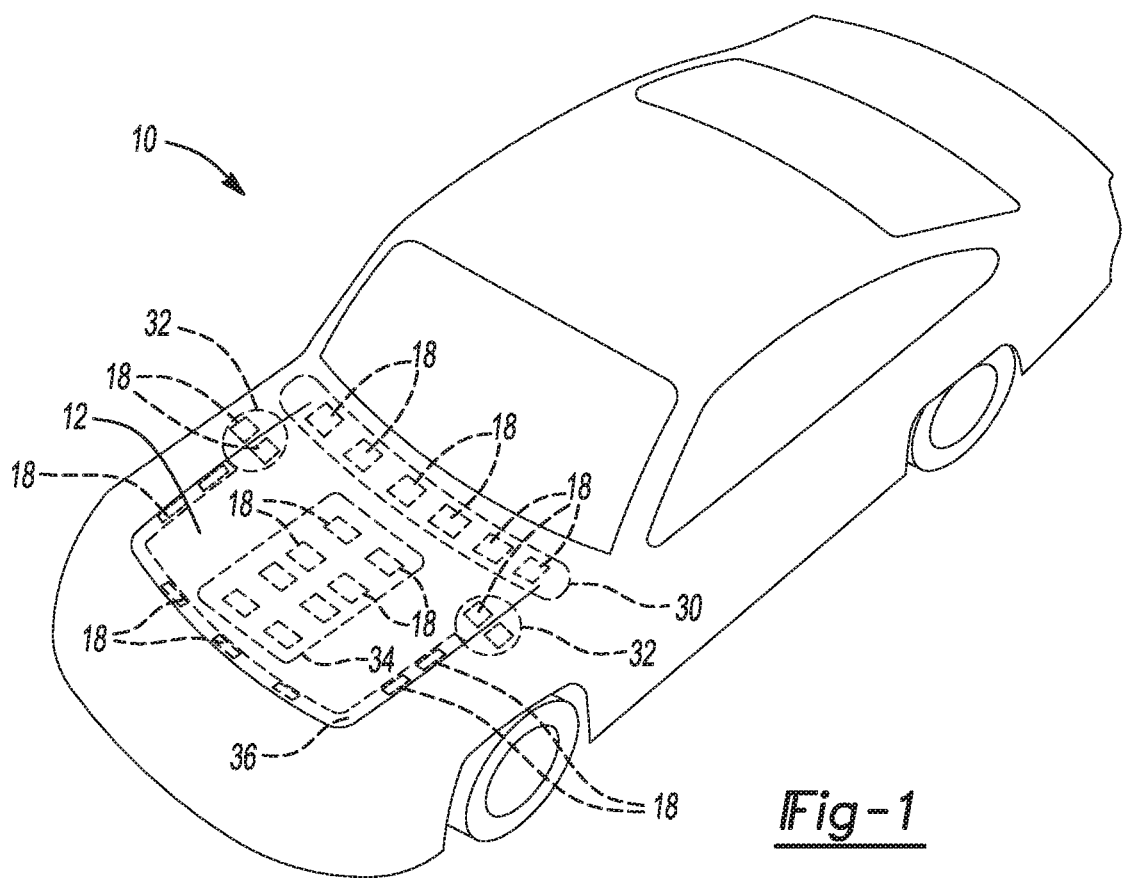
FIG. 1 is a perspective view of an example vehicle according to the present disclosure.
Figure 2:
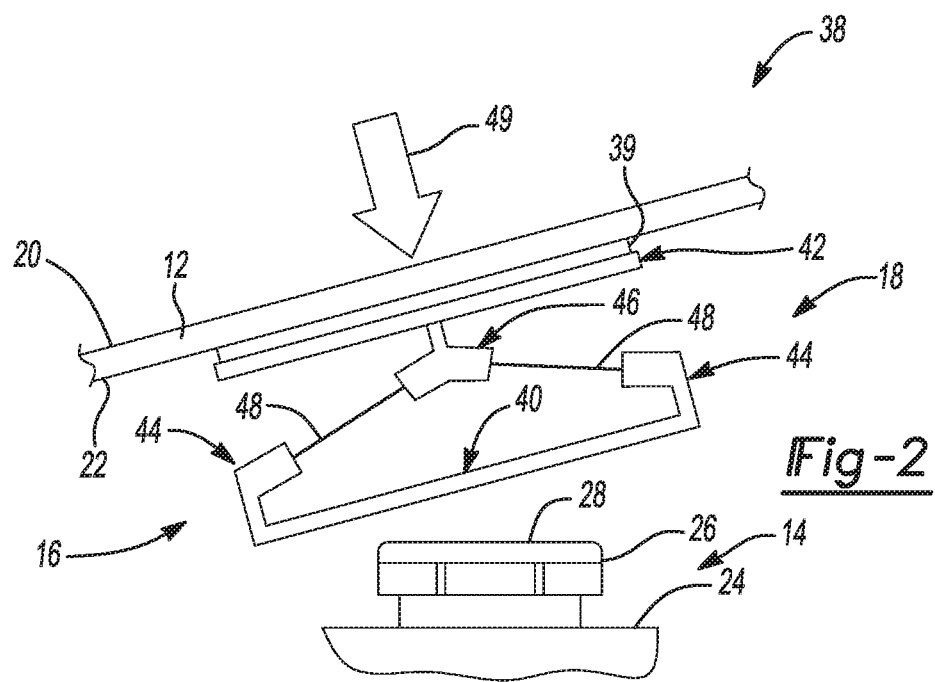
FIG. 2 is a section view of a an example of a hood impact mitigation assembly according to the present disclosure, the hood impact mitigation assembly including an energy absorbing structure.

Referring now to FIGS. 1 and 2, a vehicle 10 includes a hood 12, a plurality of components 14 disposed in an under-hood compartment 16 of the vehicle 10, and a plurality of energy absorbing structures 18 disposed between the hood 12 and the components 14. The hood 12 has a top surface 20 and an underside surface 22.

The under-hood components 14 include an air inlet panel, shock absorbers, an engine, and body structure configured to support a peripheral edge of the hood 12. FIG. 2 shows an example of one of the under-hood components 14 including a main body 24, such as a shock tower or an engine block, and a fastener 26 projecting from the main body 24 toward the hood 12. The fastener 26 forms a top surface 28 of the under-hood component 14. The top surface 28 faces the underside surface 22 of the hood 12.

The energy absorbing structures 18 are disposed in a first zone 30, a pair of second zones 32, a third zone 34, and a fourth zone 36. The energy absorbing structures 18 located in the first zone 32 are disposed between the air inlet panel and the hood 12. The energy absorbing structures 18 located in the second zones 32 are disposed between the shock absorbers and the hood 12. The energy absorbing structures 18 located in the third zone 34 are disposed between the engine and the hood 12. The energy absorbing structures 18 located in the fourth zone 36 are disposed between the body structure and the hood 12.

The hood 12, any one of the under-hood components 14, and any one of the energy absorbing structures 18 disposed between the hood 12 and the one under-hood component 14 collectively form a hood impact mitigation assembly 38. FIG. 2 shows an example of the hood impact mitigation assembly 38 in which the energy absorbing structure 18 is attached to the underside surface 22 of the hood 12 using a bonding agent or adhesive 39. In other examples of the hood impact mitigation assembly 38, the energy absorbing structure 18 may be attached to the top surface 28 of the under-hood component 14 instead of the underside surface 22 of the hood 12. In addition, the energy absorbing structure 18 may be attached to the underside surface 22 of the hood 12 or the top surface 28 of the under-hood component 14 using a fastener instead of the adhesive 39. Alternatively, the energy absorbing structure 18 may be placed between an outer panel of the hood 12 and an inner panel of the hood 12.

Figure 3:
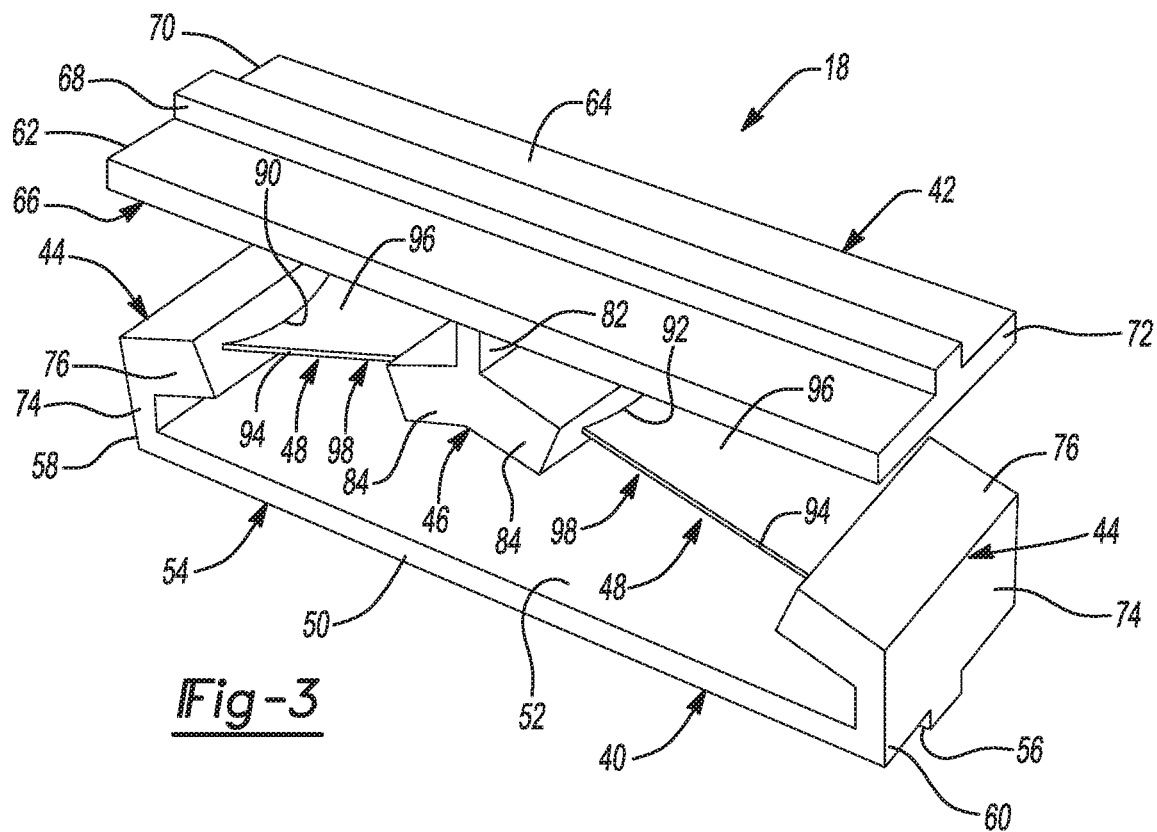
FIG. 3 is a perspective view of the energy absorbing structure of FIG. 2.
Figure 4:
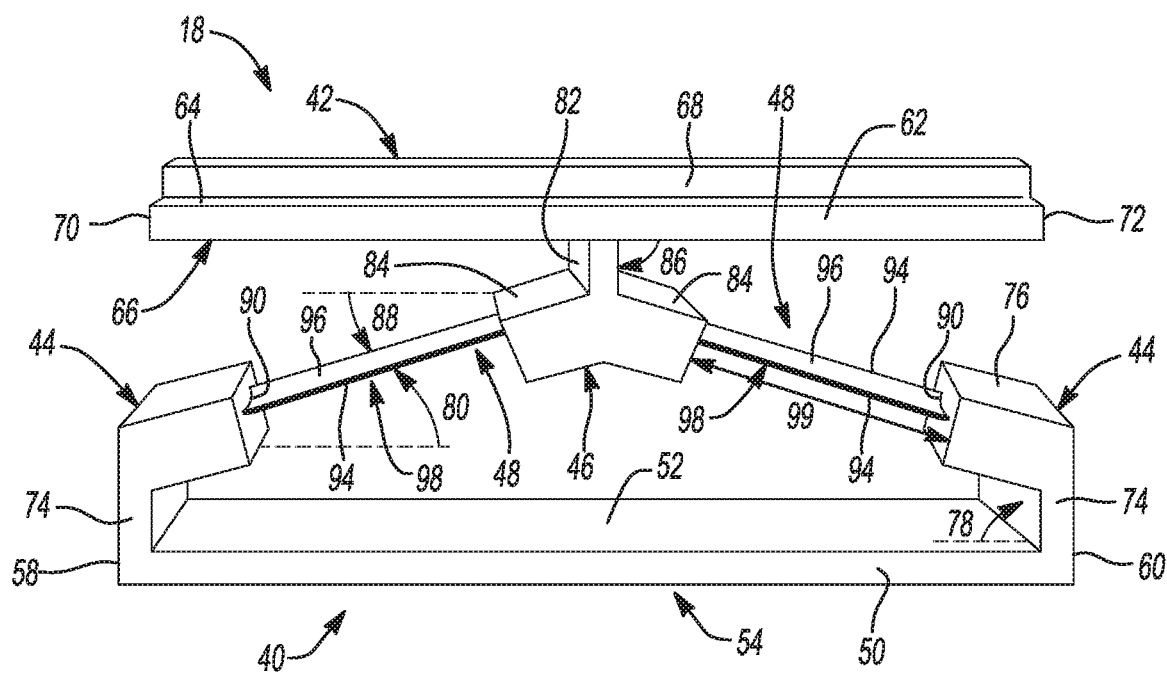
FIG. 4 is a side view of the energy absorbing structure of FIG. 2.

Referring now to FIGS. 2-4, the energy absorbing structure 18 includes a base 40, a loading platform 42, a pair of side supports 44, a center support 46, and a pair of flexible segments 48. In the example shown, the loading platform 42 is spaced apart from and parallel to the base 40. However, the loading platform 42 may not be parallel to the base 40. The side supports 44 project from opposite ends the base 40 toward the loading platform 42. The center support 46 projects from a centerline of the loading platform 42 toward the base 40. The flexible segments 48 extend from the side supports 44 to the center support 46 and connect the side supports 44 to the center support 46.

When an object impacts the top surface 20 of the hood 12, the object exerts a load 49 on the top surface 20. The load 49 is transferred through the hood 12 and is applied to the loading platform 42 of the energy absorbing structure 18 in a direction that urges the loading platform 42 toward the base 40. If the load 49 is sufficient, the flexible segments 48 elastically deform and thereby allow the loading platform 42 to move toward the base 40. In turn, the flexible segments 48 counteract the load 49 with a biasing force that urges the loading platform 42 to return to its original position (i.e., the position of the loading platform 42 relative to the base 40 before the load is applied to the loading platform 42).

The base 40 and the side supports 44 may be integrally formed as a single piece from a first material. Additionally or alternatively, the base 40 and/or the side supports 44 may be separate from other structures as shown, or the base 40 and/or the side supports 44 may be integrated into another structure. The loading platform 42 and the center support 46 may be integrally formed as a single piece from the first material. Additionally or alternatively, the loading platform 42 and/or the center support 46 may be separate from other structures as shown, or the loading platform 42 and/or the center support 46 may be integrated into another structure. The flexible segments 48 may be formed separate from the base 40, the loading platform 42, the side supports 44, and the center support 46. In addition, the flexible segments 48 may be formed from a second material. The second material may have a greater elastic limit than the first material. In one example, the first material is a polymer material (e.g., a synthetic polymer such as nylon), and the second material is a metal (e.g., spring steel). In one example, the base 40, the loading platform 42, the side supports 44, and the center support 46 may be formed via injection molding, and the side supports 44 in the center support 46 may be molded over opposite ends of the flexible segments 48.

The base 40 includes a rectangular body 50 having a top surface 52 and a bottom surface 54, and a rib 56 projecting from the bottom surface 54 of the base 40. In the example shown, the rib 56 extends along the entire length of the base 40 from a first end 58 of the base 40 to a second end 60 of the base 40. In other examples, the rib 56 may extend along only a portion of the length of the base 40 (i.e., less than the entire length of the base 40), or the rib 56 may be omitted altogether. The rib 56 may strengthen the base 40, increase the structural rigidity of the base 40, and/or facilitate attaching the base 40 the top surface 28 of the under hood component 14.

The loading platform 42 includes a rectangular body 62 having a top surface 64 and a bottom surface 66, and a rib 68 projecting from the bottom surface 66 of the loading platform 42. In the example shown, the rib 68 extends along the entire length of the loading platform 42 from a first end 70 of the loading platform 42 to a second end 72 of the loading platform 42. In other examples, the rib 68 may extend along only a portion of the length of the loading platform 42 (i.e., less than the entire length of the loading platform 42), or the rib 68 may be omitted altogether. The rib 68 may strengthen the loading platform 42, increase the structural rigidity of the loading platform 42, and/or facilitate attaching the loading platform 42 the underside surface 22 of the hood 12.

Each side support 44 includes a vertical wall 74 and an angled wall 76 projecting from the vertical wall 74. The vertical wall 74 is oriented at a first angle 78 relative to the base 40. The angled wall 76 is oriented at a second angle 80 relative to the base 40. In the example shown, the base 40 is oriented parallel to a horizontal plane, the first angle 78 is a right angle, and the second angle 80 is an oblique angle. Therefore, the vertical wall 74 of each side support 44 is oriented at a right angle relative to horizontal, and the angled wall 76 of each side support 44 is oriented at the oblique angle relative to horizontal. In other examples, the first angle 78 may be an oblique angle and/or the second angle 80 may be a right angle. Additionally or alternatively, the geometry of each side support 44 may differ from the example shown in other aspects. For example, each side support 44 may include the vertical wall 74 but not the angled wall 76. In any of these examples, each side support 44 may be designed (e.g., geometrically configured) to provide some compliance and to position one of the flexible segments 48 at a desired position with respect to the base 40.

The center support 46 includes a vertical wall 82 and a pair of angled walls 84 projecting from the vertical wall 82. The vertical wall 82 is oriented at a third angle 86 relative to the loading platform 42. Each angled wall 84 is oriented at a fourth angle 88 relative to the loading platform 42. In the example shown, the loading platform 42 is oriented parallel to a horizontal plane, the third angle 86 is a right angle, and the fourth angle 88 is an oblique angle. Therefore, the vertical wall 82 of the center support 46 is oriented at a right angle relative to horizontal, and each angled wall 84 of the center support 46 oriented at an oblique angle relative to horizontal. In addition, the fourth angle 88 between each angled wall 84 of the center support 46 and the loading platform 42 is equal to the second angle 80 between each angled wall 76 of the side supports 44 and the base 40. The angled wall 76 of each side support 44 defines a curved slot 90 that receives one end of the flexible segments 48, and each angled wall 84 of the center support 46 defines a curved slot 92 that receives the other end of the flexible segments 48. In other examples, the third angle 86 may be an oblique angle and/or the fourth angle 88 may be a right angle. Additionally or alternatively, the geometry of each side support 44 may differ from the example shown in other aspects. For example, each side support 44 may include the vertical wall 82 but not the angled wall 84. In any of these examples, each side support 44 may be designed (e.g., geometrically configured) to provide some compliance and to position one of the flexible segments 48 at a desired position with respect to the base 40.

The material and geometry (e.g., thickness, curvature, width) of each flexible segment 48 may be similar or identical to that of tape in a metal tape measure. Each flexible segment 48 has straight edges 94, a curved top surface 96 disposed between the straight edges 92, and a curved bottom surface 98 disposed between the straight edges 94. The curved top surface 96 of each flexible segment 48 faces the loading platform 42. The curved bottom surface 98 of each flexible segment 48 faces the base 40. In the example shown, the curved top surface 96 is a concave surface, and the curved bottom surface 98 is a convex surface. In other examples, the curved top surface 96 may be a convex surface, and the curved bottom surface 98 may be a concave surface. In still other examples, the curved top surface 96 of one of the flexible segments 48 may be a concave surface, and the curved top surface 96 of the other one of the flexible segments 48 may be a convex surface. In these examples, the curved bottom surface 98 of the one flexible segment 48 may be a convex surface, and the curved bottom surface 98 of the other flexible segment 48 may be a concave surface.

The straight edges 90 of each flexible segment 48 are oriented at the second angle 80 relative to the base 40. Each flexible segment 48 has a length 99 that extends from one of the side supports 44 to the center support 46. For a given material and cross section of each flexible segment 48, the second angle 80 and the length 99 may be selected to achieve a desired balance between (i) a peak load withstood by the energy absorbing structure 18 before the flexible segments 48 deform and (ii) an amount of energy dissipated by the energy absorbing structure 18.

The second angle 80 at which the flexible segments 48 are oriented relative to the base 40 may be an angle between 5 degrees and 95 degrees (e.g., an angle between 30 degrees and 70 degrees). The length of each flexible segment 48 may be selected based on a radius of curvature of the top or bottom surface 96 or 98 and an angle by which the top or bottom surface 96 or 98 extends around its locus. For example, the length of the flexible segment 48 may be between a first length and a second length. The first length may be equal to a product of the extension angle and the curvature radius. The second length may be equal to a product of 10 and the first length. The extension angle may range from 30 degrees to 180 degrees. An extension angle of 180 degrees corresponds to one-half of a hollow tube.

FIGS. 2-4 show an example of the position of the loading platform 42 relative to the base 40, and the geometry of the flexible segments 48, before the load 49 is applied to the loading platform 42 and/or when the load 49 is not sufficient to significantly deform the flexible segments 48. When the load 49 is sufficient to deform the flexible segments 48, the loading platform 42 moves in the direction of the load 49 toward the base 40. Depending on the magnitude of the load 49, the loading platform 42 may continue to move in the direction of the load 49 until the loading platform 42 contacts the base 40, or the loading platform 42 may stop moving toward the base 40 before the loading platform 42 contacts the base 40. In either case, the flexible segments 48 bias the loading platform 42 away from the base 40 to return the loading platform 42 to its original position shown in FIG. 4 when the load 49 is removed and/or the magnitude of the load 49 decreases.

The flexible segments 48 are compliant structures. Compliant structures can deform without moving parts such as hinges, while avoiding plastic deformation. When the load 49 is applied to the loading platform 42, the load 49 impart a bending moment on the flexible segments 48. When subjected to the bending moment, the flexible segments 48 initially do not deform significantly. In turn, the amount of load withstood and energy absorbed by the energy absorbing structure 18 rapidly increases until the withstood load reaches a peak load, at which point the flexible segments 48 deform or snap and the withstood load decreases rapidly. The amount by which the flexible segments 48 deform when the bending moment 48 is initially applied may be less than 10 percent of the amount by which the flexible segments 48 deform after the withstood load reaches a peak load.

Referring now to FIGS. 5A, 5B, 6A, and 6B, each flexible segment 48 can bend into different manners—same sense bending or opposite sense bending. FIGS. 5A and 5B illustrate same sense bending, and FIGS. 6A and 6B illustrate opposite sense bending. In FIG. 5A, a moment 100 is applied to opposite ends of the flexible segment 48, but the flexible segment 48 has not yet deformed in response to the moment 100. In FIG. 5B, the flexible segment 48 is bent about a hinge 102 in a direction in which the moment 100 is applied. Since the flexible segment 48 is bent toward the side of the flexible segment 48 that has the concave surface, the bending is referred to as same sense bending.

In FIG. 6A, a moment 104 is applied to opposite ends of the flexible segment 48, but the flexible segment 48 has not yet deformed in response to the moment 104. The direction of the moment 104 is opposite of the direction of the moment 100. In FIG. 6B, the flexible segment 48 is bent about a hinge 106 in a direction in which the moment 104 is applied. Since the flexible segment 48 is bent toward the side of the flexible segment 48 that has the convex surface, the bending is referred to as opposite sense bending.

Same sense bending as a relatively low peak load and less energy dissipation potential, while opposite sense bending has a significantly higher initial stiffness and more abrupt transformation resulting in a greater energy dissipation. Briefly referring again to FIGS. 2-4, when the load 49 is applied to the loading platform 42, one of the flexible segments 48 may experience same sense bending, while the other flexible segment 48 may experience opposite sense bending. Additionally or alternatively, each flexible segment 48 may experience both same sense bending and opposite sense bending. In other words, while some deformation events are simple in the sense that just one type of bending occurs in one of the flexible segments 48, other deformation events are more complex as two or more bending events may occur at different locations in the same flexible segment 48. In general, the longer and thinner the segment, the more complex are the possible deformations for that segment. The energy dissipated by the energy absorbing structure 18 is a function of the type of bending experienced by the flexible segments 48, as well as the second angle 80 at which the flexible segments 48 are oriented with respect to the base 40 and the length 99 of the flexible segments 48.

Referring now to FIG. 7, a curve 108 represents the relationship between a moment applied to the opposite ends of the flexible segment 48 and the angle of those ends relative to horizontal. The curve 108 is plotted with respect to an x-axis 110 and a y-axis 112. The x-axis 110 represents the angle of the ends of the flexible segment 48 in radians. The y-axis represents the moment applied to the ends of the flexible segment 48 in Newton-meters (Nm).

When the flexible segment 48 is subjected to opposite sense bending, the moment applied to the opposite ends of the flexible segment 48 is positive. Thus, the portion of the curve 108 above a horizontal line 114 at zero moment corresponds to opposite sense bending. During opposite sense bending for the particular sample at hand, the moment increases from a zero moment at an angle of zero radians to a peak moment 116 at an angle of approximately 0.75 radians. At that angle, the moment decreases sharply to a plateau moment 118. The moment remains at the plateau moment 118 as the angle continues to increase. Other samples may show similar behavior although the numerical values associated with the mechanical response may differ.

When the flexible segment 48 is subjected to same sense bending, the moment applied to the opposite ends of the flexible segment 48 is negative. Thus, the portion of the curve 108 below the horizontal line 114 at zero moment corresponds to same sense bending. During same sense bending for the particular sample at hand, the moment decreases from a zero moment at an angle of zero radians to a peak moment 120 at an angle of approximately −0.25 radians. At that angle, the moment increases to a plateau moment 122. The moment remains at the plateau moment 122 as the angle continues to decrease. Other samples may show similar behavior although the numerical values associated with the mechanical response may differ.

Figure 8:
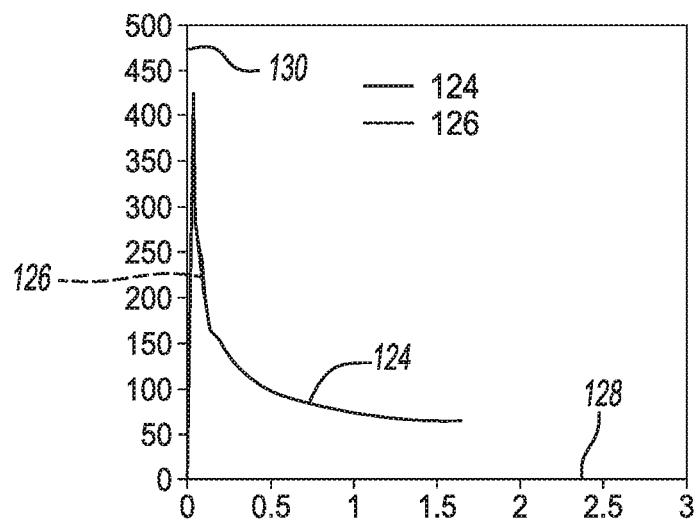
FIGS. 8-10 are graphs illustrating relationships between a load applied to a loading platform of the energy absorbing structure of FIG. 2 and a corresponding displacement of the loading platform.
Figure 9:
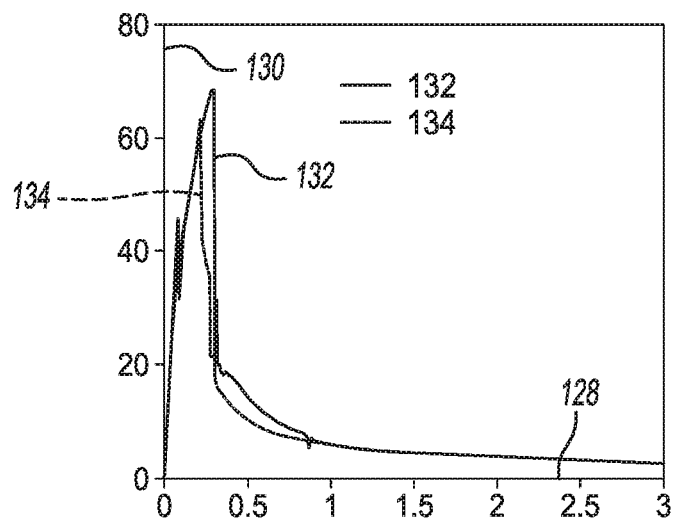
Figure 10:
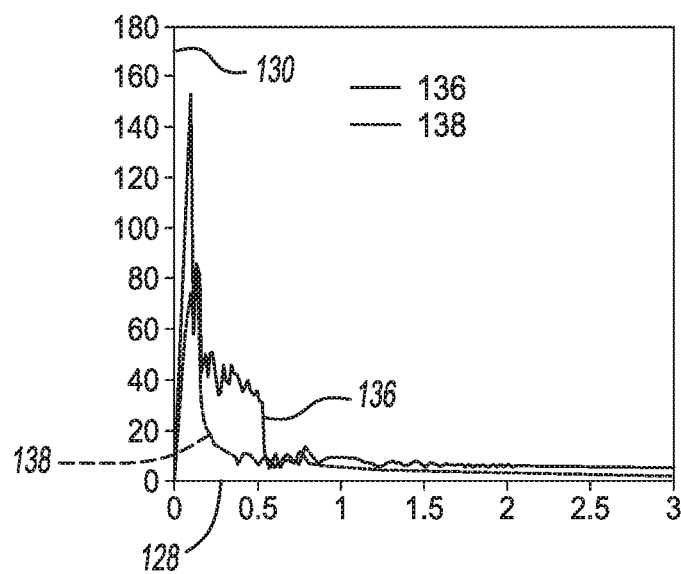

FIGS. 8-10 illustrate loading and unloading curves for the flexible segment 48 with different values of (i) the second angle 80 at which the flexible segment 48 is oriented with respect to the base 40 and (ii) the length 99 of the flexible segment 48. FIG. 8 shows a loading curve 124 and an unloading curve 126 for the flexible segment 48 when the length 99 of the flexible segment 48 is 53.2 millimeters (mm) and the second angle 80 of the flexible segment 48 is 60 degrees. The loading and unloading curves 124 and 126 are plotted with respect to an x-axis 128 that represents displacement in mm and a y-axis 130 that represents load in Newtons (N).

FIG. 9 shows a loading curve 132 and an unloading curve 134 for the flexible segment 48 when the length 99 of the flexible segment 48 is 87.4 mm and the second angle 80 of the flexible segment 48 is 10 degrees. FIG. 10 shows a loading curve 136 and an unloading curve 138 for the flexible segment 48 when the length 99 of the flexible segment 48 is 190 mm and the second angle 80 of the flexible segment 48 is 60 degrees. The loading and unloading curves 132, 136 and 134, 138 are plotted with respect to the x-axis 128 representing displacement in mm and a y-axis 130 that representing load in N.

The area between the loading and unloading curves indicates the amount of energy dissipated by the flexible segment 48. In FIG. 8, the loading and unloading curves 124 and 126 are nearly on top of one another. Therefore, very little energy is dissipated by the flexible segment 48. In FIG. 9, there is a greater degree of separation between the loading and unloading curves 130 to 134, and therefore a greater amount of energy is dissipated by the flexible segment 48 relative to FIG. 8. In FIG. 10, there is an even greater degree of separation between the loading unloading curves 136 and 138, and therefore a greater amount of energy is dissipated by the flexible segment 48 relative to both FIGS. 8 and 9.

While the flexible segment 48 corresponding to FIG. 10 exhibit the greatest amount of energy dissipation, the flexible segment 48 corresponding to FIG. 8 or 9 may be preferred over the flexible segment 48 corresponding to FIG. 10 in some instances. More generally, energy dissipation may not be the only consideration when selecting values for the second angle 80 at which the flexible segments 48 are oriented with respect to the base 40 and the length 99 of the flexible segments 48. Peak load or other relevant criteria may also be considered when selecting these values.

The loading curve 124 of FIG. 8 reaches a peak load of about 425 N. The loading curve 130 of FIG. 9 reaches a peak load of about 70 N. The loading curve 134 of FIG. 10 reaches a peak load of about 155 N. Thus, if a maximum peak load of 70 N is desired, the flexible segment 48 corresponding to FIG. 9 may be selected over the flexible segment 48 corresponding to FIG. 10 even though the flexible segment 48 corresponding to FIG. 10 dissipates more energy.

The peak load withstood by the flexible segment 48 is equal to the peak load applied to an object impacting the hood 12. Thus, the peak load withstood by the flexible segment 48 may be limited to avoid damaging an object impacting the hood 12. However, if the peak load withstood by the flexible segment 48 is too low, the flexible segment 48 may deform enough to allow the loading platform 42 to contact the base 40, which may result in a second peak load that is higher than the first peak load. Thus, the second angle 80 of the flexible segment 48 and the length 99 of the flexible segment 48 may be selected to yield a maximum allowable peak load and to maximize the amount of energy dissipated by the flexible segment 48.

FIG. 9 illustrates the amount by which the flexible segment 48 deforms when a load is initially applied to the flexible segment 48 relative to the amount by which the flexible segment 48 deforms after the load applied to the flexible segment 48 reaches its peak. The deformation of the flexible segment 48 when the load applied to the flexible segment reaches its peak is about 0.25 mm, while the total deformation after the load applied to the flexible segment 48 reaches its peak is greater than 2.5 mm. Thus, the amount by which the flexible segment 48 deforms when a load is initially applied to the flexible segment 48 is less than 10 percent of the amount by which the flexible segment 48 deforms after the load applied to the flexible segment 48 reaches its peak.

Figure 11:
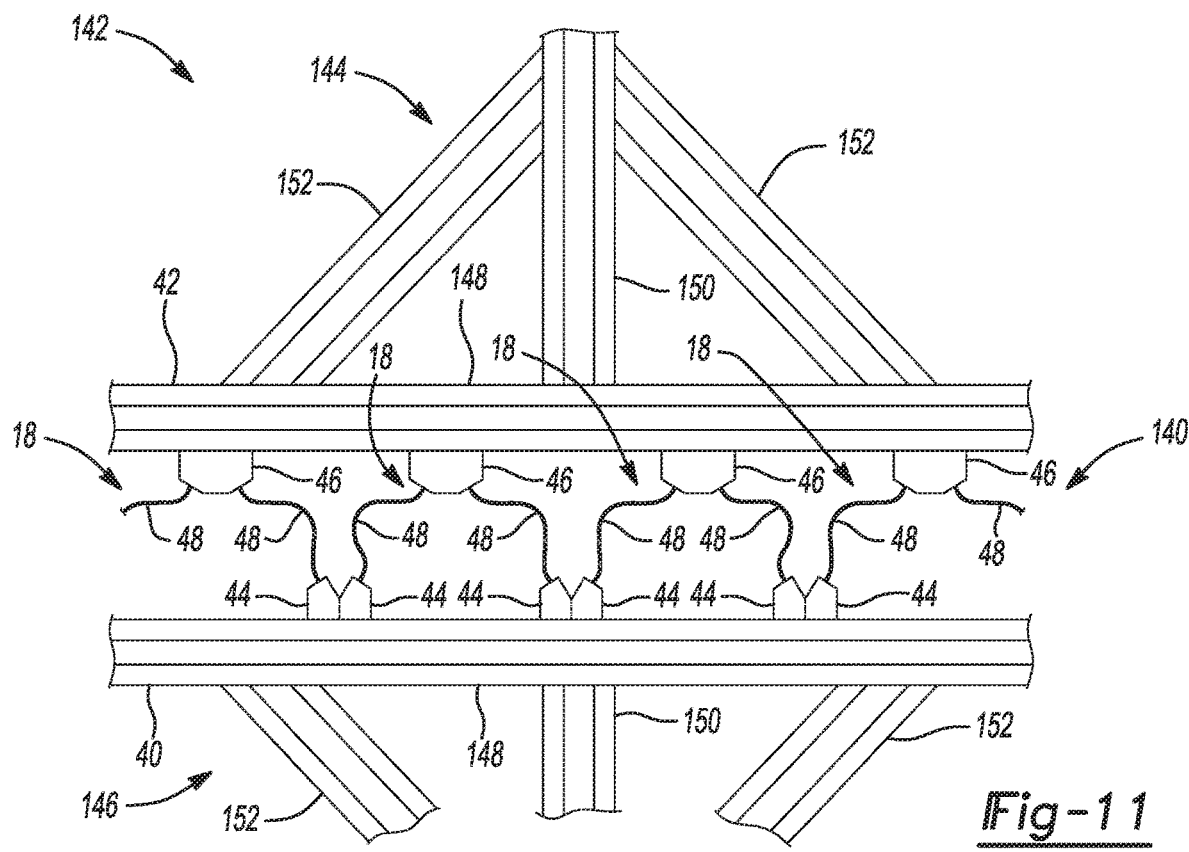
FIG. 11 is a front view of an example of an energy absorbing system according to the present disclosure.

Referring now to FIG. 11, multiple ones of the energy absorbing structure 18 are arranged adjacent to one another to form an energy absorbing system 140. In the example shown, the energy absorbing structures 18 are arranged side-by-side such that they are mechanically in parallel (i.e., they experience the same displacement, but share the applied load). The outside surface of at least one of the side supports 44 of each energy absorbing structure 18 is facing or abutted against the outside surface of the side support 44 of another one of the energy absorbing structures 18. In various implementations, a unitary or single piece structure may form one the side supports 44 of two of the energy absorbing structures 18 that are adjacent to one another. In various implementations, the energy absorbing system 140 may be arranged by arranging the energy absorbing structures 18 in stacks rather than side-to-side such that they are mechanically in series (i.e., they experience the same load, but share the displacement).

The energy absorbing system 140 is shown mounted in a test apparatus 142. The test apparatus 142 includes an upper loading truss 144 and the loading truss 146. Each of the upper and lower loading trusses 144 and 146 includes a horizontal beam 148, a vertical beam 150, and a pair of angled beams 152. The horizontal beam 148 of the upper loading truss 144 forms the loading platform 42 of each of the energy absorbing structures 18. The horizontal beam 148 of the lower loading truss 146 forms the base 40 of each of the energy absorbing structures 18.

At least one of the upper and lower loading trusses 144 and 146 is coupled to an actuator (not shown) operable to move one of the upper and lower loading trusses 144 and 146 toward the other one of the upper and lower loading trusses 144 and 146. In this manner, the test apparatus 142 applies a compression load to the energy absorbing system 140. In contrast to FIGS. 2-4, FIG. 11 shows the energy absorbing structures 18 with the flexible segments 48 in an elastically deformed state in response to the load applied by the test apparatus 142.

Figure 12:
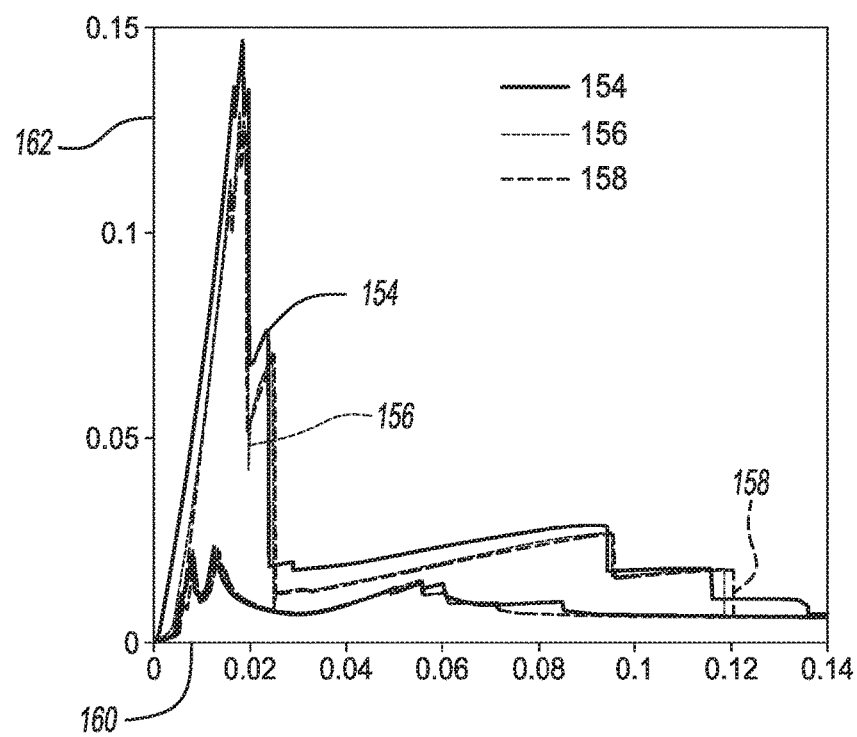
FIGS. 12-14 are graphs illustrating stress-strain curves for the energy absorbing system of FIG. 11.
Figure 13:
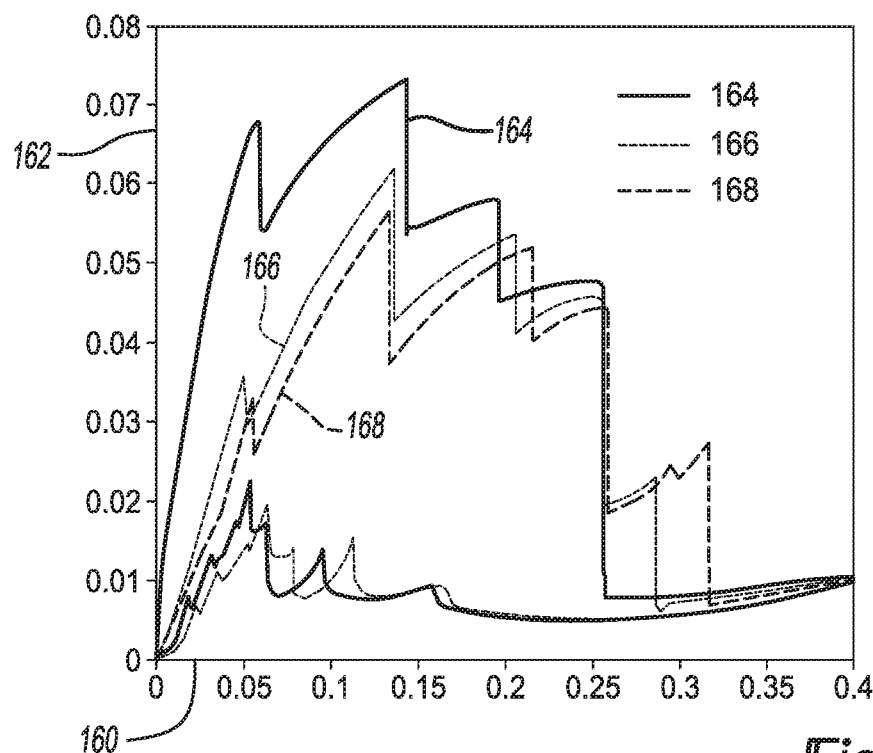
Figure 14:
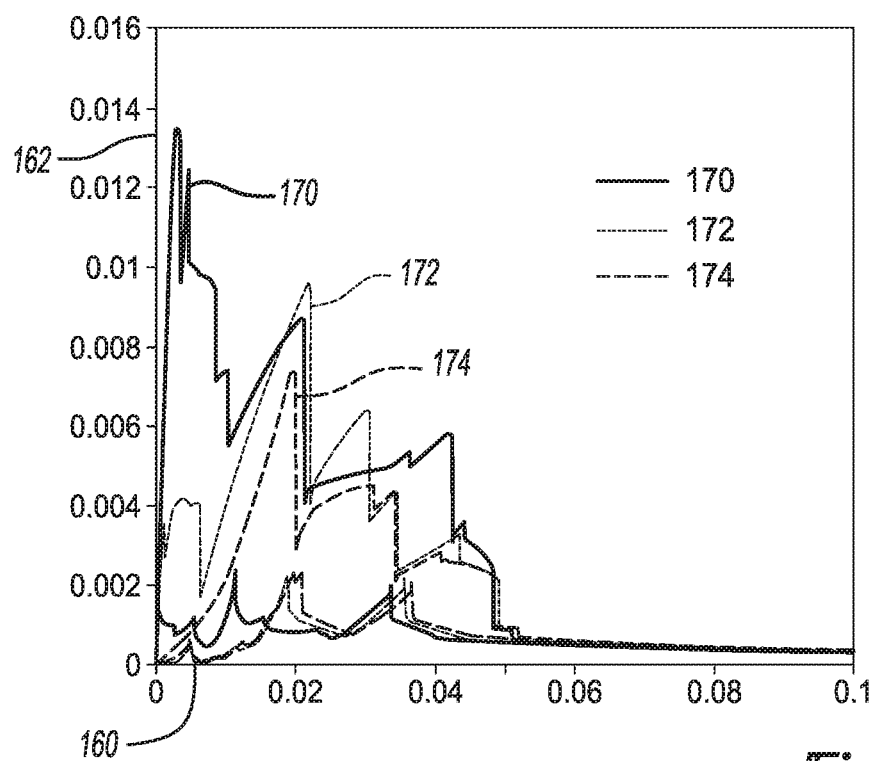

FIGS. 12-14 illustrate stress-strain curves over three loading-unloading cycles for the energy absorbing system 140 with different values of (i) the second angle 80 at which the flexible segment 48 is oriented with respect to the base 40 and (ii) the length 99 of the flexible segment 48. FIG. 12 shows stress-strain curves for the energy absorbing system 140 when the length 99 of the flexible segment 48 is 53.2 mm and the second angle 80 of the flexible segment 48 is 60 degrees. The stress-strain curves of FIG. 12 include a first stress-strain curve 154 corresponding to a first cycle, a second stress-strain curve 156 corresponding to a second cycle, and a third stress-strain curve 158 corresponding to a third cycle. The stress-strain curves 154, 156, 158 are plotted with respect to an x-axis 160 that represents strain and a y-axis 162 that represents stress in megapascals (MPa).

FIG. 13 shows stress-strain curves for the energy absorbing system 140 when the length 99 of the flexible segment 48 is 87.4 mm and the second angle 80 of the flexible segment 48 is 10 degrees. The stress-strain curves of FIG. 13 include a first stress-strain curve 164 for a first cycle, a second stress-strain curve 166 for a second cycle, and a third stress-strain curve 168 for a third cycle. The stress-strain curves 164, 166, 168 are plotted with respect to the x-axis 160 representing strain and the y-axis 162 representing stress in MPa.

FIG. 14 shows stress-strain curves for the energy absorbing system 140 when the length 99 of the flexible segment 48 is 190 mm and the second angle 80 of the flexible segment 48 is 60 degrees. The stress-strain curves of FIG. 14 include a first stress-strain curve 170 for a first cycle, a second stress-strain curve 172 for a second cycle, and a third stress-strain curve 174 for a third cycle. The stress-strain curves 170, 172, 174 are plotted with respect to the x-axis 160 representing strain and the y-axis 162 representing stress in MPa.

In FIG. 12, the loading portions of the stress-strain curves 154, 156, 158 are close to one another, and the unloading portions of the stress-strain curves 154, 156, 158 are close to one another. Thus, the energy absorbing system 140 corresponding to FIG. 12 exhibits a repeatable performance over the three loading-unloading cycles, which is desired. In contrast, in FIG. 13, there is a greater degree of separation between (i) the loading portion of the first stress-strain curve 164 and (ii) the loading portions of the second and third stress-strain curves 156 and 158, which is not desired. Similarly, in FIG. 14, there is a greater degree of separation between (i) the loading portion of the first stress-strain curve 170 and (ii) the loading portions of the second and third stress-strain curves 172 and 174, which is not desired.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. An energy absorbing structure comprising:
    a base;
    a loading platform spaced apart from the base;
    a pair of side supports projecting from the base toward the loading platform, wherein the base and the side supports are integrally formed as a single piece;
    a center support projecting from the loading platform toward the base, wherein the loading platform and the center support are integrally formed as a single piece; and
    a pair of flexible segments extending from the side supports to the center support and connecting the side supports to the center support, the flexible segments having straight edges and curved surfaces disposed between the straight edges, wherein:
        the straight edges extend from the side supports to the center support and are oriented at an oblique angle relative to the base;
        each of the curved surfaces faces one of the base and the loading platform; and
        the flexible segments are formed separate from the base, the side supports, the loading platform, and the center support.

2. The energy absorbing structure of claim 1 wherein:
    the base, the side supports, the loading platform, and the center support are formed from a first material; and
    the flexible segments are formed from a second material that is different than the first material.

3. The energy absorbing structure of claim 2 wherein the second material is has a greater elastic limit than the first material.

4. The energy absorbing structure of claim 2 wherein the first material is a polymer material and the second material is a metal.

5. The energy absorbing structure of claim 1 wherein the oblique angle at which the flexible segments are oriented relative to the base is an angle between 5 degrees and 95 degrees.

6. The energy absorbing structure of claim 1 wherein each of the flexible segments has a length that extends from one of the side supports to the center support, and the length is a multiple of a product of a radius of curvature of the curved surfaces and an angle by which the curved surfaces extend around their respective loci.

7. The energy absorbing structure of claim 1 wherein when a load is applied to the loading platform in a direction that urges the loading platform toward the base, the flexible segments are configured to elastically deform while absorbing energy.

8. The energy absorbing structure of claim 7 wherein when the loading platform moves closer to the base as the flexible segments elastically deform in response to the load, the flexible segments counteract the bad with a biasing force that urges the loading platform to return to its original position.

9. The energy absorbing structure of claim 1 wherein each of the side supports includes a vertical wall and an angled wall, the vertical wall being oriented at a right angle relative to the base, the angled wall being oriented at the same oblique angle relative to the base at which the flexible segments are oriented relative to the base.

10. The energy absorbing structure of claim 9 wherein the center support includes a vertical wall and a pair of angled walls, the vertical wall of the center support being oriented at a right angle relative to the loading platform, each of the angled walls of the center support being oriented at the same oblique angle relative to the loading platform at which the flexible segments are oriented relative to the base.

11. The energy absorbing structure of claim 10 wherein each of the angled walls of the side supports define curved slots that receive first ends of the flexible segments, and each of the angled walls of the center support define curved slots that receive second ends of the flexible segments opposite of the first ends.

12. The energy absorbing structure of claim 1 wherein the curved surfaces of each of the flexible segments include a convex surface that faces the base and a concave surface that faces the loading platform.

13. An energy absorbing system including multiple ones of the energy absorbing structure of claim 1 arranged adjacent to one another in a side-by-side manner such that an outside surface of at least one of the side supports of one of the energy absorbing structures faces an outside surface of one of the side supports of another one of the energy absorbing structures.

14. A hood impact mitigation assembly comprising:
a vehicle hood having a top surface and an underside surface;
a vehicle component disposed underneath the vehicle hood, the vehicle component having a top surface facing the underside surface of the vehicle hood; and
an energy absorbing structure disposed between the vehicle hood and the vehicle component and attached to one of the underside surface of the vehicle hood and the top surface of the vehicle component, the energy absorbing structure including:
a base;
a loading platform spaced apart from the base;
a pair of side supports projecting from the base toward the loading platform, wherein the base and the side supports are integrally formed as a single piece;
a center support projecting from the loading platform toward the base, wherein the loading platform and the center support are integrally formed as a single piece; and
a pair of flexible segments extending from the side supports to the center support and connecting the side supports to the center support, the flexible segments having straight edges and curved surfaces disposed between the straight edges, wherein:
the straight edges extend from the side supports to the center support and are oriented at an oblique angle relative to the base;
each of the curved surfaces faces one of the base and the loading platform; and
the flexible segments are formed separate from the base, the side supports, the loading platform, and the center support.

15. The hood impact mitigation assembly of claim 14 wherein the energy absorbing structure is attached to the underside surface of the vehicle hood.

16. The hood impact mitigation assembly of claim 14 wherein:
the base and the side supports are formed from a polymer material;
the loading platform and the center support are formed from the polymer material; and
the flexible segments are formed from a metal.

17. The energy absorbing structure of claim 14 wherein when a load is applied to the loading platform in a direction that urges the loading platform toward the base, the flexible segments are configured to elastically deform while absorbing energy.

18. The energy absorbing structure of claim 17 wherein when the loading platform moves closer to the base as the flexible segments elastically deform in response to the bad, the flexible segments counteract the bad with a biasing force that urges the loading platform to return to its original position.

19. The energy absorbing structure of claim 14 wherein the curved surfaces of each of the flexible segments include a convex surface that faces the base and a concave surface that faces the loading platform.

20. The energy absorbing structure of claim 14 wherein each of the flexible segments has a length that extends from one of the side supports to the center support, and the length is a multiple of a product of a radius of curvature of the curved surfaces and an angle by which the curved surfaces extend around their respective loci.

* * * * *